(12) United States Patent
Zhang

(10) Patent No.: US 11,750,377 B2
(45) Date of Patent: Sep. 5, 2023

(54) MULTI-SOURCE ENCRYPTED IMAGE RETRIEVAL METHOD BASED ON FEDERATED LEARNING AND SECRET SHARING

(71) Applicant: Nanhu Laboratory, Jiaxing (CN)

(72) Inventor: Lei Zhang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 18/084,965

(22) Filed: Dec. 20, 2022

(65) Prior Publication Data
US 2023/0216668 A1 Jul. 6, 2023

(30) Foreign Application Priority Data
Dec. 30, 2021 (CN) .......................... 202111641508.6

(51) Int. Cl.
*H04L 9/08* (2006.01)
*G06N 3/0464* (2023.01)
*G06N 3/08* (2023.01)
*G06F 21/60* (2013.01)

(52) U.S. Cl.
CPC ............ *H04L 9/085* (2013.01); *G06F 21/602* (2013.01); *G06N 3/0464* (2023.01); *G06N 3/08* (2013.01)

(58) Field of Classification Search
None
See application file for complete search history.

(56) References Cited

U.S. PATENT DOCUMENTS

| 10,423,985 | B1 * | 9/2019 | Dutta | .................... H04L 67/306 |
| 11,556,846 | B2 * | 1/2023 | Silberman | .............. G06N 3/126 |
| 2013/0245429 | A1 * | 9/2013 | Zhang | .................... A61B 6/485 |
| | | | | 600/424 |
| 2020/0076884 | A1 * | 3/2020 | Li | .......................... H04L 9/0637 |

(Continued)

OTHER PUBLICATIONS

Janani et al.; SEcure Similar Image Matching (SESIM): An Improved Privacy Preserving Image Retrieval Protocol over Encrypted Cloud Database; IEEE (Year: 2021).*

(Continued)

*Primary Examiner* — Amare F Tabor
*Assistant Examiner* — Mahabub S Ahmed
(74) *Attorney, Agent, or Firm* — Kirk A. Wilson; Joseph T. Guy; Patent Filing Specialist Inc.

(57) ABSTRACT

Disclosed is a multi-source encrypted image retrieval method based on federated learning and secret sharing, including the following steps: S1. performing model training on a convolutional neural network of double cloud platforms based on federated learning, with an image owner joining the double cloud platforms as a coalition member; and S2. completing, by an authorized user, encrypted image retrieval based on additive secret sharing with the assistance of the double cloud platforms. The present disclosure provides a multi-source encrypted retrieval scheme based on federated learning and secret sharing, which simplifies the neural network model structure for retrieval by using federated learning, to obtain better network parameters. Better neural network parameters and a more simplified network model structure are achieved by compromising overheads on the image owner side, such that a better convolutional neural network can be used in encrypted image retrieval.

20 Claims, 3 Drawing Sheets

(56) References Cited

U.S. PATENT DOCUMENTS

| | | | | |
|---|---|---|---|---|
| 2020/0366459 | A1* | 11/2020 | Nandakumar | H04L 9/008 |
| 2021/0374502 | A1* | 12/2021 | Roth | G06N 3/08 |
| 2021/0406560 | A1* | 12/2021 | Park | G06V 10/82 |
| 2022/0270146 | A1* | 8/2022 | Diedrich | G06Q 30/0609 |
| 2022/0284232 | A1* | 9/2022 | Yin | G06V 10/774 |
| 2022/0300618 | A1* | 9/2022 | Ding | G06F 21/60 |
| 2022/0344049 | A1* | 10/2022 | Hall | G16H 30/40 |
| 2022/0366220 | A1* | 11/2022 | Roth | G06N 3/047 |
| 2022/0375134 | A1* | 11/2022 | Zhao | G01S 7/4808 |
| 2022/0405883 | A1* | 12/2022 | Gou | G06T 3/4076 |
| 2022/0415059 | A1* | 12/2022 | Smolyanskiy | B60W 60/0016 |
| 2023/0082173 | A1* | 3/2023 | Li | G06F 21/60 |

OTHER PUBLICATIONS

Yuan et al., Federated Neural Architecture Search; Conference'17, Jul. 2017, Washington, DC, USA (Year: 2017).*

Hsu, et al.; Image Feature Extraction in Encrypted Domain With Privacy-Preserving SIFT; IEEE (Year: 2012).*

Guo et al.; Privacy-preserving image search (PPIS): Secure classification and searching using convolutional neural network over large-scale encrypted medical images; w w w . e l s e v i e r . c o m / l o c a t e / c o s e (Year: 2020).*

Wang et al.; Privacy-Preserving Outsourced Feature Extractions in the Cloud: A Survey; IEEE (Year: 2017).*

Hu et al.; Securing SIFT: Privacy-Preserving Outsourcing Computation of Feature Extractions Over Encrypted Image Data; IEEE (Year: 2016).*

Xia et al.; Secure Image LBP Feature Extraction in Cloud-Based Smart Campus; IEEE (Year: 2018).*

Li et al.; Similarity Search for Encrypted Images in Secure Cloud Computing; IEEE (Year: 2020).*

Huang et al.; Toward Efficient Encrypted Image Retrieval in Cloud Environment; IEEE (Year: 2019).*

Payman Mohassel et al; "SecureML: A System for Scalable Privacy-Preserving Machine Learning"; 2017 IEEE Symposium on Security and Privacy.

Han Jiang et al; "Cryptographic Approaches for Privacy-Preserving Machine Learning"; Journal of Electronics & Information Technology; vol. 42. No. 5; May 2020.

Candidate name: Guohua Cheng; "Research of Content-Based Multi-Source Encrypted Image Retrieval Technology in Crowds"; School of Computer, Beijing Institute Technology; Jun. 2018.

* cited by examiner

MULTI-SOURCE ENCRYPTED IMAGE RETRIEVAL METHOD BASED ON FEDERATED LEARNING AND SECRET SHARING

CROSS REFERENCE TO RELATED APPLICATION

This patent application claims the benefit and priority of Chinese Patent Application No. 202111641508.6, filed with the China National Intellectual Property Administration on Dec. 30, 2021, the disclosure of which is incorporated by reference herein in its entirety as part of the present application.

TECHNICAL FIELD

The present disclosure relates to the technical field of encrypted image retrieval, and in particular, to a multi-source encrypted image retrieval method based on federated learning and secret sharing.

BACKGROUND

With the increasing popularity of electronic imaging devices, image resources have increased dramatically. People gradually have the need to search for similar images. The Internet has started to provide similar services, for example, Baidu provides a search-by-image service. However, high-quality image resources are of high value and should not be directly disclosed on the Internet. Therefore, it is a practical task to consider a solution to support image owners to outsource their high-value images to a cloud platform, while ensure that the cloud platform can support a retrieval services for these encrypted images without knowing the image contents. Existing encrypted image retrieval can be divided into two main categories: image retrieval based on encrypted features and image retrieval based on encrypted images.

In image retrieval schemes based on encrypted features, an image owner first extracts image feature vectors such as SIFT features. The core problem of such schemes is to ensure the validity of distance measurement between encrypted features after feature encryption, and some important works are as follows: Lu et al. firstly proposed three encryption techniques including bit randomization, random projection and random unary encoding. Xia et al. proposed the use of random linear transformation and random value to protect original data for the measurement scheme of Earth Mover's Distance. Yuan et al. used the secure k-nearest neighbor technique such that the feature index construction is accomplished with the assistance of the cloud platform. Shen et al. and Zhang et al. used the classical homomorphic encryption tool to complete the encryption of features. However, homomorphic encryption significantly reduces the efficiency of the scheme. After finishing the encryption of image features, the image owner encrypts the images by using a stream encryption or symmetric encryption scheme, and outsources the encrypted features and the encrypted images.

In the image retrieval based on encrypted images, the image owner directly encrypts the images and it is ensured that the cloud platform can parse out features for retrieval from the encrypted images. Some important works are as follows: Ferreira et al. proposed scrambling pixel locations and histograms of RGB color values of the image through scrambling encryption. However, a distance between color histograms that is parsed out from the encrypted image by using the same key is still valid. Inspired by the fact that local features are more suitable for retrieval than global features, based on the above scheme, Xia et al. further divided the pixel location scrambling into in-block scrambling and inter-block scrambling, introduced a bag-of-words model to speed up retrieval, and used multi-table scrambling to encrypt the image color values to better resist known background attacks. To reduce storage overheads, some researchers further considered encrypted image retrieval in the JPEG format. However, the above schemes can only extract low-accuracy statistical features for retrieval efficiency. In order to obtain accuracy similar to that of plaintext, some researchers focus on extracting classical plaintext features from encrypted image. Hsu et al. firstly considered using homomorphic encryption to extract encrypted SIFT features, but this scheme requires a lot of interaction between image owners on the one hand, and has security risks on the other. Subsequent works pointed out that it is difficult to avoid these problems in single cloud platform solutions. Therefore, such solutions are commonly used in double-cloud-platform systems or multi-cloud-platform systems. Some important schemes are as follows: Hu et al. combined a partial homomorphic encryption scheme with the SIMD technology to construct an efficient batch-wise multiplication and batch-wise comparison protocol between two cloud platforms. However, this scheme still takes tens of hours to extract SIFT features of a regular-sized image. Liu et al. used the garbled circuit technique in multi-party secure computing to complete the extraction of pre-trained neural network features. However, on the one hand, this scheme only extracts features of the fully connected layer, which lacks generality, and on the other hand, it still takes more than 10 seconds during retrieval. In a recent scheme, Xia et al. used the secret sharing technique to extract encrypted features of the convolutional layer. The retrieval time of this scheme is less than 2s. However, the accuracy of this scheme is still not high enough for large datasets, the retrieval time is still not low enough for high-resolution images. Besides, this scheme cannot guarantee the information theoretic security of images.

The model in the above schemes usually considers the case where a single image owner outsourcing images, which significantly limits application scenarios of the schemes. In recent works, Gu et al. explicitly pointed out that a multi-source encrypted image retrieval scheme should be able to support an authorized user to obtain, through constant rounds of interaction, similar images outsourced by all image owners that authorize the user, while ensuring the security of images of all image owners under a reasonable threat model. However, this scheme only considers encrypted statistical features, and the retrieval accuracy of the authorized user is low, which cannot address the real-world challenges. In summary, although the encrypted image retrieval has been studied for more than a decade, the existing schemes still have the following problems:

(1) Multi-source encrypted image retrieval is not supported. All existing single-cloud solutions cannot fully meet the functional requirements of multi-source encrypted image retrieval, and have the problem of low accuracy. Although the multi-cloud platform solution is easy to expand into multi-source encrypted image retrieval, the existing strategies still have problems such as high time consumption or low security.

(2) Insufficient retrieval accuracy: the existing optimal encrypted image retrieval scheme considers the convolutional layer features of the pre-trained neural network, which still has a large room for improvement in accuracy under large samples, while the rest of the conventional feature or statistical feature schemes still have problems in accuracy even under small samples.

(3) High time consumption: among the existing high-accuracy schemes based on double cloud platforms, the technique based on the secret sharing strategy has the lowest time consumption. However, such techniques require a large amount of interactive computing for nonlinear computation, which results in high time consumption for communication.

SUMMARY

To solve the foregoing problems, an objective of the present disclosure is to provide a multi-source encrypted image retrieval method based on federated learning and secret sharing.

In order to achieve the above-mentioned objective, the present disclosure employs the following technical solutions:

A multi-source encrypted image retrieval method based on federated learning and secret sharing, including the following steps:

S1. performing model training on a convolutional neural network of double cloud platforms based on federated learning, with an image owner joining the double cloud platforms as a coalition member; and S2. completing, by an authorized user, encrypted image retrieval based on additive secret sharing with the assistance of the double cloud platforms.

In the foregoing multi-source encrypted image retrieval method based on federated learning and secret sharing, in step S1, the image owner trains the neural network in the following manner:

S11. obtaining, by the image owner, a network structure, weight information and bias information $b_i$ of the convolutional neural network from the double cloud platforms $S_i$, and restoring the convolutional neural network: $W=W_1+W_2$, $b=b_1+b_2$;

S12. making labels of to-be-uploaded pictures, and train the convolutional neural network by using the to-be-uploaded pictures;

S13. after the training is finished, sending two gradient shares $G_1$ and $G_2$ of gradient information G, two image shares $\{I_1\}$ and $\{I_2\}$ of to-be-uploaded image information $\{I\}$, and two tension shares $\{T_1\}$, $\{T_2\}$ of to-be-uploaded tension information $\{T\}$ to two cloud platforms $S_1$ and $S_2$ respectively; and S14. updating, by the double cloud platforms $S_i$, the weight information according to the gradient shares $G_i$, and performing calculation on the tension shares $T_i$ by using the network after the weight update to obtain comparison features $\{F_F\}$, where during practical use, the comparison features $\{F_1\}$ are updated regularly, e.g., updated every 24 hours, to avoid frequent updates while ensuring correspondence with network weight parameters used during retrieval.

Those skilled in the art should understand that i in $S_i$, $G_i$, and $F_F$ represent 1 and 2, denoting the two cloud platforms, two gradient shares, two tension shares, and two comparison features. A share value is in a predetermined finite field (such as $Z_2 32$), and operations on the share value are all operations in a modulus field, where Z represents an integer field, which also applies to the following description.

In the foregoing multi-source encrypted image retrieval method based on federated learning and secret sharing, in step S11, the network structure of the convolutional neural network includes convolutional layers, activation function layers, pooling layers, and fully connected layers; node quantities of the fully connected layers of the double cloud platforms $S_i$ are consistent with image types involved in the double cloud platforms $S_i$, and convolutional layers of initial networks of the double cloud platforms $S_i$ use pre-trained weights, initial weights of the fully connected layers are generated randomly based on a normal distribution, and all subsequent image owners re-train the model having updated network parameters through steps S11 to S14.

In the foregoing multi-source encrypted image retrieval method based on federated learning and secret sharing, step S2 specifically includes:

S21. converting, by the authorized user, a to-be-queried picture into tension information, splitting the tension information $\{QT\}$ by means of additive secret sharing, and sending the split tension information to the double cloud platforms $S_i$ respectively, that is, sending the two tension shares $\{QT_1\}$, $\{QT_2\}$ of the tension information $\{QT\}$ to the two cloud platforms $S_1$, $S_2$ respectively;

S22. performing, by the double cloud platforms $S_i$, collaborative encryption computing according to the tension shares $QT_i$ of the tension information $S_i$, to obtain respective encrypted features $QF_C$;

S23. collaboratively measuring, by the double cloud platforms $S_i$, distances between the extracted encrypted features $QF_C$ and the comparison features $\{F_F\}$, and returning image information $\{I_i\}$ of similar images to the authorized user according to measurement results; and S24. restoring, by the authorized user, an original plaintext image $\{I\}$ based on the two image shares $\{I_i\}$.

In the foregoing multi-source encrypted image retrieval method based on federated learning and secret sharing, in step S14, the comparison features $\{F_1\}$ are obtained in the following manner:

S141. performing, by the double cloud platforms $S_i$, encrypted feedforward computing on the received tension shares $T_i$ by using the network after the weight update, and extracting features of last pooling layers;

S142. performing additive aggregation on the features of the pooling layers; and S143. using feature vectors after the additive aggregation as the comparison features $\{F_F\}$.

In step S22, the encrypted features $QF_C$ are obtained in the following manner:

S221. performing, by the double cloud platforms $S_i$, encrypted feedforward computing on the received tension shares $QT_i$, and extracting features of last pooling layers;

S222. performing additive aggregation on the features of the pooling layers; and S223. using feature vectors after the additive aggregation as the encrypted features $QF_C$.

In the foregoing multi-source encrypted image retrieval method based on federated learning and secret sharing, a computing strategy of the encrypted feedforward computing includes a Beaver's triplet-based secure multiplication protocol SecMul for the fully connected layers and the convolutional layers, an activation layer protocol SecReLU for the activation function layers, and a pooling layer protocol SecMaxpool for max pooling layers.

The secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends $(a_i, b_i, c_i)$ to $S_i$; in an online stage: 2. $S_i$ perform the following calculation: $a_i=u_i-a_i$, $=v_i-b_i$; 3. $S_i$ restore $\alpha$ and $\beta$; 4. $S_i$ perform the following calculation: $f_i=c_1+b_i\alpha+$ $a_i\beta+(i-1)\alpha\beta$. In this case, $f_1+f_2=uv$; specifically, this protocol implements $SecMul(x_i, y_i) \to (x*y)_i$.

In the foregoing multi-source encrypted image retrieval method based on federated learning and secret sharing, the activation layer protocol SecReLU is as follows: the double cloud platforms own shares of a value a, where the value a is any value among input vectors of a ReLU layer; in an offline stage: 1. the image owner generates random numbers required by sub-protocols involved in the protocol and sends the random numbers to $S_i$; in an online stage: 2. $S_i$ perform the following calculation: $SecSgn(a)=b_i$; 3. $S_i$ calculate $SS(b_i, a, 0)$.

A secure positive/negative judgment protocol SecSgn is as follows: the double cloud platforms $S_i$ own secret shares $a_i$ of a value a; in an offline stage: 1. the image owner generates random numbers required by sub-protocols involved in the protocol and sends the random numbers to $S_i$; in an online stage: 2. $S_i$ collaboratively perform the following calculation: $SecCmp(2*a_i)=b_i$; 3. $S_i$ perform the following calculation: $MSB(a_i) b_i=res_i$, and in this case, the double cloud platforms $S_i$ obtain share values with a plus or minus sign; and if $res_1 \oplus res_2=1$, the original value a is a positive number; otherwise, a is a negative number.

A secure selection protocol SS is as follows: the double cloud platforms $S_i$ own shares $[b]_i^2$ of a bit value b, and two to-be-selected values x, y; in an offline stage: 1. the image owner generates a random bit value c as well as shares $[c]_i^2$ and $c_1$ of the random bit value on $Z_2$ and $Z_L$, and sends the random bit value as well as the shares to $S_i$; 2. the image owner generates random numbers required by sub-protocols involved in the protocol and sends the random numbers to $S_i$; in an online stage: 3. $S_i$ perform the following calculation: $[e]_i^2=[b]_i^2 \oplus [c]_i^2$; 4. $S_i$ restore e; 5. if $e=1$, $S_i$ lets $c_i=1-c_1$, and $S_2$ lets $c_2=-c_2$ 6. $S_i$ perform the following calculation: $res_i=SecMul(y_i — x_i, c_i)+x_i$. In this case, the double cloud platforms $S_i$ obtain the share values of the secretly selected value; if b is 0, $res_1+res_2=x$; otherwise, $res_1+res_2=y$.

A secure value comparison protocol SecCmp is as follows: the double cloud platforms $S_i$ own secret shares $a_i$ of a value a; in an offline stage: 1. the image owner generates a random value x as well as bits corresponding to the random value; 2. the image owner calculates share values $x_i$ of x as well as share values $[x[t]]_i^2$ of the bits of the random value, and sends the calculated share values to the double cloud platforms $S_i$, where a 32-bit number is used for calculation in this scheme, and therefore t belongs to [0, 31]; 3. the image owner calculates whether $x_i+x_2$ is greater than L, where $L=2^{32}$; if yes, $\alpha=0$; otherwise, $\alpha=1$; then, the image owner generates a share $[\alpha]_i^2$ of $\alpha$ on $Z_2$; in an online stage: 4. $S_i$ perform the following calculation: $r_i=a_i+x_i$ and determine whether $a_i+x_i$ is greater than L; if yes $\beta_i=1$; otherwise, $\beta_i=0$; 5. $S_i$ restore r and determine whether $r_i+r_2$ is greater than L; if yes, $\delta=1$; otherwise, $\delta=0$; 6. $S_i$ collaboratively perform the following calculation: $SecBitCmp([x[t]]_i^2, r+1)=[\eta]_i^2$. In step 6, $S_i$ performs the calculation of $\theta_1=\beta_i \oplus \delta \oplus \eta_1 \oplus \alpha_1$ and $S_2$ performs the calculation of $\theta_2=\beta_2 \oplus \eta_2 \oplus \alpha_2$; in this case, the double cloud platforms $S_i$ obtain share values of the information of whether a is greater than L, that is, this protocol implements $SecCmp(a_i|x_i, [x[t]]_i^2, [a]_i^2)=\theta_i$.

A secure bit comparison protocol SecBitCmp is as follows: the double cloud platforms $S_i$ each own a share $[x[t]]_i^P$ of all 1 bits x[t] of a secret value x under $Z_p$, 1 bits r[t] of a public number r, a share $[\beta]_i^2$ and $[\beta]_i^P$ of a random bit $\beta$ under $Z_2$ and $Z_p$, and a secret share $[m]_i^P$ of a random number m, where $m \in Z_p^*$ (that is, m is a positive integer less than p), $1=32$, and $L=2^1$; in an off line stage: 1. the image owner generates random numbers required by sub-protocols involved in the protocol and sends the random numbers to the double cloud platforms $S_i$; in an online stage: 2. $S_i$ perform the following calculation: $u[i]=SecMul([1-2\beta]_i^P, [x[t]]_i^P-r[t])$, where $t \in [0, 1-1]$; 3. $S_i$ perform the following calculation $[w[t]]_i^P=[x[t]]_i^P-2*r[t] * [x[t]]_i^P \pmod p$, where $S_i$ performs the calculation of $[w[t]]_1^P=[w[t]]_1^P; +r[t] \pmod p$; 4. $S_i$ perform the following calculation: $[c[t]]_i^P=[u[t]]_1^P=[w[k]]_1^P+r[t] \pmod p$, and then $S_i$ performs the calculation of $[c[t]]_i^P=1+[c[t]]_i^P \pmod p$; 5. $S_i$ perform the following calculation $d=m_i * \Pi_{t=0}^{l-1} c[t] \pmod p$, where the calculation is completed by using a three-number multiplication protocol SecThreeMul and a secure multiplication protocol SecMul; 6. if $d=0$, $S_i$ obtains bits $[\eta]_1^2[\beta]_1^2$; otherwise, $S_1$ obtains bits $[\eta][\beta]_1^2 \oplus 1$; $S_2$ obtains bits $[\eta]_2^2[\beta]_2^2$; in this case, the double cloud platforms $S_i$ each obtain a share value of a comparison result, that is, this protocol implements $SecCmp([x[t]]_i^P, r|[\beta]_i^2, [\beta]_i^P, m_i)=[\eta]_i^2$, where the secure multiplication protocol SecMul is the same as the foregoing Beaver's triplet-based secure multiplication protocol SecMul for the fully connected layers and the convolutional layers, and details are not described herein again.

The three-number multiplication protocol SecThreeMul is as follows: the double cloud platforms $S_i$ own $x_i, y_i, z_i$; in an off line stage: 1. the image owner generates random numbers required by sub-protocols involved in the protocol and sends the random numbers to $S_i$; 2. the image owner generates random integers a, b, c and performs the following calculation: $d=abc$; 3. the image owner calculates secret shares of a, b, c, d and sends the secret shares to $S_i$; in an online stage: 4. $S_i$ collaboratively calculate $SecMul(x_i, y_i)$, $SecMul(x_i, z_i)$, and $SecMul(y_i, z_i)$ to obtain $xy_i$, $xz_i$, and $yz_i$; 5. $S_i$ perform the following calculation $e_i=x_i-a_i$, $f_i=Y_i-b_i$, and $g_i=z_i-c_i$, and collaboratively restore e, f, g; 6. $S_i$ perform the following calculation: $xyz_i=d_i—x_i*f*g-y_i*e*g-z_i*e*f+e*yz_i+f*xz_i+g* xy_i$; 7. $S_i$ perform the following calculation: $xyz_i=xyz_i+e*f * g$; thus, the double cloud platforms $S_i$ obtain two additive secret shares of xyz; that is, this protocol implements $SecThreeMul(x_i, y_i, z_i) (x*y * z)_i$. Because steps 4 and 5 can be performed concurrently, this protocol only requires one round of communication.

In the foregoing multi-source encrypted image retrieval method based on federated learning and secret sharing, the pooling layer is a max pooling layer, and the pooling layer protocol SecMaxpool is as follows: the double cloud platforms $S_i$ own to-be-compared data $x_i, y_i, z_i, t_i$. In an offline stage: 1. the image owner generates random numbers required by sub-protocols involved in the protocol and sends the random numbers to $S_i$; in an online stage: 2. $S_i$ call SecSgn and SS to calculate $max(x_i, y_i)$ and $max(z_i, t_i)$; 3. $S_i$ calls SecSgn and SS to calculate $max(max(x_i, y_i), max(z_i, t_i))$.

In the foregoing multi-source encrypted image retrieval method based on federated learning and secret sharing, in step S23, a method for distance measurement includes a secure distance protocol SecDis, which is as follows: the double cloud platforms $S_i$ own encrypted vectors $\{x_i\}$ and $\{y_i\}$; in an offline stage: 1. image owners generate random numbers required by sub-protocols involved in the protocol and send the random numbers to $S_i$; in an online stage: 2. $S_i$ calculate differences between vector elements, and collaboratively calculate $SecMul(x_i-y_i, x_i-Y_i)$; 3. $S_i$ calculate a sum of all vector values; in this case, the double cloud platforms $S_i$ obtain secret shares of a squared value of a Euclidean distance between two vectors.

In the foregoing multi-source encrypted image retrieval method based on federated learning and secret sharing, in step S23, a method for distance measurement includes a secure distance protocol SecSort, which is as follows: the double cloud platforms $S_i$ each own a share $\{x_i\}$ of a large quantity of to-be-compared values; in an offline stage: 1. image owners generate random numbers required by sub-protocols involved in the protocol and send the random numbers to $S_i$; 2. the image owner generates a random positive value k and a random value b, and sends share values thereof to the double cloud platforms $S_i$, where value ranges of the value k and the value b are determined in advance, and it is ensured that a result of kx+b is definitely within a share range of x; in this scheme, 0.1<k<10 and −100<b<100; in an online stage: 3. the double cloud platforms $S_i$ calculate $S_i$ and disclose the value of {kx+b}.

The present disclosure has the following advantages:

A multi-source encrypted image retrieval scheme based on federated learning and secret sharing is provided. A neural network model structure used for retrieval is simplified by using federated learning, better network parameters are obtained.

Better neural network parameters and a more simplified network model structure are achieved by compromising overheads on the image owner side, such that a better convolutional neural network can be used in encrypted image retrieval. In this way, the user can obtain a more optimized result more quickly during retrieval.

The three-number multiplication protocol and other protocols are introduced to the positive/negative judgment protocol of the key step in the encrypted feedforward process, to reduce the rounds of interaction.

Based on federated learning, the image owner (provider) is used as a coalition member to train the model, and the secret sharing technique based on double cloud platforms is used, which can ensure that the neural network with a simpler structure and higher security is used in retrieval, thereby improving the accuracy and efficiency of subsequent retrieval while improving the information security of the image content, to fully ensure the practicability of the encrypted image retrieval scheme.

DETAILED DESCRIPTION OF THE EMBODIMENTS

The present disclosure is described in further detail with reference to the accompanying drawings.

Figure 1:
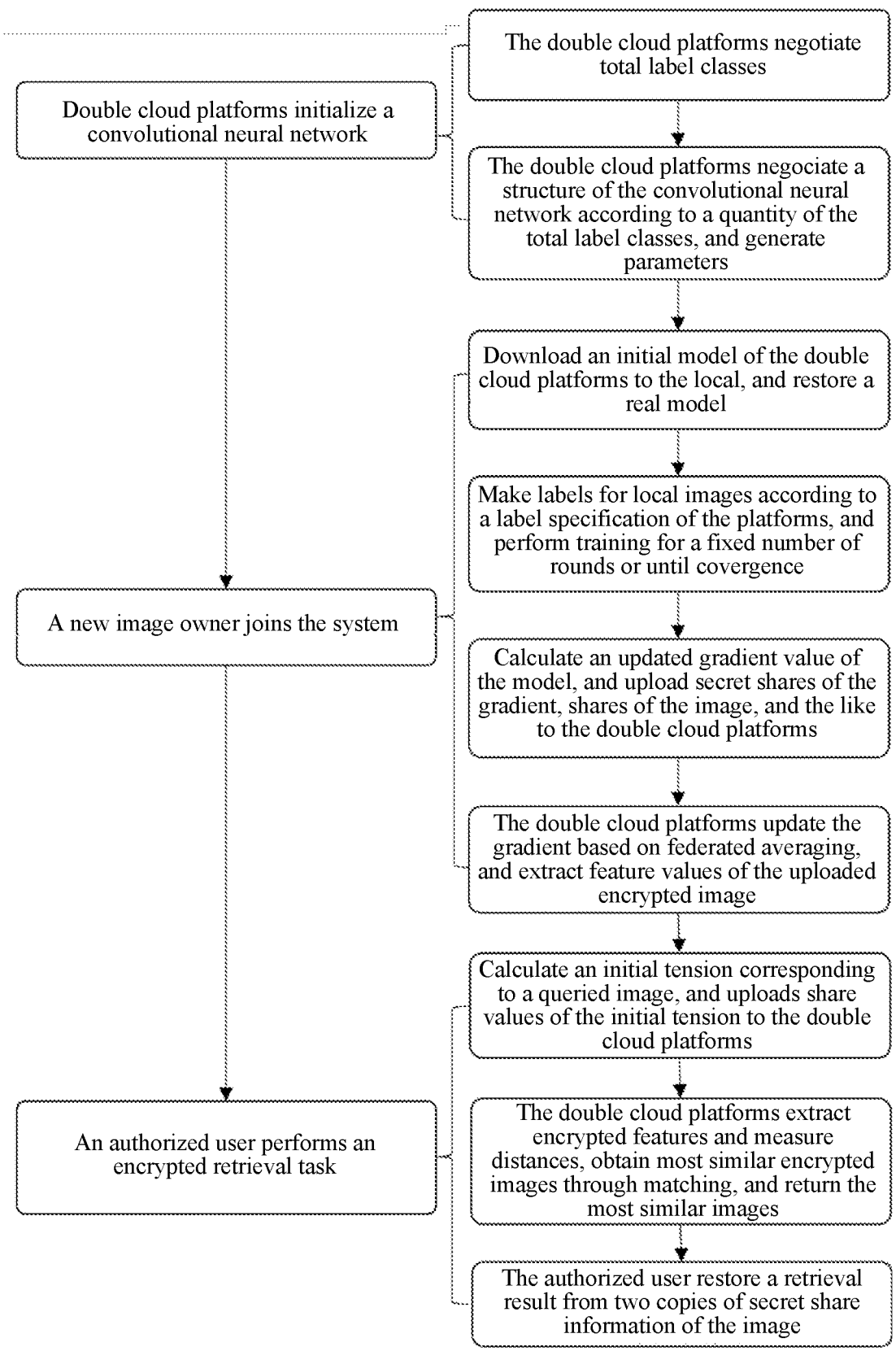
FIG. 1 is a flowchart of a multi-source encrypted image retrieval method based on federated learning and secret sharing according to the present disclosure.

As shown in FIG. 1, steps during practical use of a multi-source encrypted image retrieval method based on federated learning and secret sharing according to the present disclosure are described in detail below:

Initialization of double cloud platforms:

S11: Two non-collaborating service providers form double cloud platforms, and identify a quantity of image types n involved in respective business scopes.

S12: The double cloud platforms use a VGG11 network as a network structure of a convolutional neural network, which includes convolutional layers, activation function layers, pooling layers, and fully connected layers, where parameters trained using an ImageNet database are used as initial weights, the last fully connected layer in the neural network in step S11 is replaced with a new fully connected layer according to a quantity of classes, to ensure that a node quantity of the last layer is n. For example, the cloud platform involves three classes: characters, houses and flowers; in this case, the last layer includes three nodes. Network weights and bias values in the fully connected layers are randomly generated based on a normal distribution. It should be noted that, the fully connected layer is mainly used for satisfying the training process of the federated learning, and features for retrieval are mainly extracted from the pooling layer.

An image owner is added to serve as a coalition member to perform model training on the convolutional neural network, so as to continuously improve the accuracy of the model and optimize parameters of the model, thus ensuring that a neural network with a simpler structure can be used in retrieval. An authorized user is a user with a retrieval permission authorized by the platform; the authorized user may or may not be an image owner.

First round of image owner joining:

S21: The image owner downloads two share values $W_i$, $b_i$ of an initial network structure and weight bias information from the double cloud platforms $S_i$, and restores real network initial weight parameters: $W=W_1+W_2$, $b=b_1+b_2$.

S22: The image owner makes labels for its own images according to the classes predefined by the cloud platforms, and trains the neural network locally for a fixed number of rounds or until model convergence. In the present disclosure, 100 rounds of training is used as an example. The label is preferably encoded as one-hot vector. For example, the cloud platform divides images into three classes: characters, houses and flowers; in this case, a character image can be encoded as [1, 0, 0], and other images are encoded in a similar way.

Preferably, additive secret sharing is defined in an integer field $Z_2 32$, where 12 places are fixedly defined as decimal places, and the rest are integer places. In addition, update of parameter weights of the scheme is also restricted in the integer field $Z_2 32$. It should be noted that, this range is perfectly adequate for common neural network models.

S23: The image owner calculates total gradient information G by comparing network parameters at convergence and the initial network weights, generates two additive shares $G_1$ and $G_2$ of the gradient information G, where $G_1+G_2=G$, and sends the shares to the double cloud platforms $S_i$; at the same time, the image owner splits the image itself into two additive shares $\{I_1\}$, $\{I_2\}$, and sends the shares to the double cloud platforms $S_i$; meanwhile, the image owner generates tension information {T} of each image after initial retrieval conversion, splits the tension information into additive shares $\{T_1\}$, $\{T_2\}$, and sends the shares to the double cloud platforms $S_i$. The initial image retrieval conversion is as follows: 1. adjusting the size of the image to be 256*256; 2. converting the image into a vector ranging from 0 to 1; 3. normalizing the image, where mean coefficients are (0.4914, 0.4822, 0.4465), and standard deviation coefficients are (0.2023, 0.1994, 0.2010).

S24: The double cloud platforms $S_i$ update the weights according to the gradient shares $G_i$ by using a federated averaging algorithm; the double cloud platforms $S_i$ save secret shares of the image information, to wait for subsequent user retrieval; the double cloud platforms $S_i$ perform encrypted feedforward computing on the received tension shares $T_i$ by using the updated weight information, extract features of last pooling layers, perform additive aggregation on the pooling layer features 512*16*16, that is, calculate 256 values in 512 dimensions to serve as 512-dimensional features, use feature vectors after the additive aggregation as comparison features $\{F_F\}$, and store the features for use in distance measurement during subsequent user retrieval.

S25: The image owner generates random numbers involved in secure protocols SecMul, SecThreeMul, SecBitCmp, SecCmp, SecSgn, SecReLU, SecMaxpool, and SecSort. That is, in an offline stage, a large quantity of available random numbers are generated for each protocol.

Subsequent image owners repeat the foregoing steps to train the model having the updated network parameters, so as to update the model again. User retrieval:

S31: An authorized user performs initial retrieval conversion on a to-be-queried image to obtain tension information $\{QT\}$, and transmits the image to the double cloud platforms $S_i$ by using additive secret shares on domain $Z_2$32, where the initial retrieval conversion is consistent with that performed by the image owner, and the authorized user mainly refers to an image owner joining the double cloud platforms.

S32: The double cloud platforms $S_i$ complete encrypted feedforward of the convolutional neural network according to tension share values $QT_S$, and extract values of last pooling layers after additive aggregation to serve as encrypted features $QF_C$.

S33: The double cloud platforms perform the following calculation: SecMul($QF_i-\{F_i\}$, $QF_i-\{F_i\}$), to obtain encrypted squared values of euclidean distances, then sort the secure distance values based on a SecSort protocol, find a fixed quantity of most similar image shares $\{I_i\}$, and return the found image shares to the authorized user, where the most similar image shares may be a fixed quantity of image shares $\{I_i\}$ that are most similar to the to-be-queried image.

S34: The authorized user restores an original plaintext image $\{I\}$ from the two image shares $\{I_i\}$ of the image. In this case, the user has obtained a plurality of images most similar to the queried image.

Specifically, a computing strategy of the encrypted feedforward computing in S24 and S32 include a Beaver's triplet-based secure multiplication protocol SecMul for the fully connected layers and the convolutional layers, where the triplet is provided by the image owner, an activation layer protocol SecReLU for the activation function layers, and a pooling layer protocol SecMaxpool for max pooling layers.

In the following protocols, (mod p) represent a mapping relation from outside the domain to inside the domain, which ensures that the operation always occurs in the corresponding modulus field.

The letters in each protocol have no real meaning. For example, a, b, c, d generally denote random number; x, y, z, t generally denote input; u, v, $\alpha$, $\beta$, f, r and the like generally denote calculation results or output, which are not described in detail below.

The secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends ($a_i$, $b_i$, $c_i$) to $S_i$; in an online stage: 2. $S_i$ perform the following calculation: $a_i = u_i - a_i$, $=v_i - b_i$; 3. $S_i$ restore $\alpha$ and $\beta$; 4. $S_i$ perform the following calculation: $f_i = c_i + b_i a + + (i-1)\alpha\beta$. In this case, $f_1 + f_2 = uv$; specifically, this protocol implements SecMul($x_i$, $(x*y)_i$).

In the present disclosure, the activation layer adopts a ReLU function for calculating a magnitude relationship between the secret shares and 0. In other words, it is necessary to calculate a highest bit of the value is 0 or 1. The present disclosure innovatively designs a new secure positive/negative judgment protocol SecSgn, which includes three sub-protocol: a three-number multiplication protocol SecThreeMul, a secure bit comparison protocol SecBitCmp, and a secure value comparison protocol SecCmp, and introduces the protocols to the feedforward process of the neural network to reduce the rounds of interaction. The specific implementation is as follows:

The activation layer protocol SecReLU is as follows: the double cloud platforms $S_i$ own secret shares $a_i$ of a value a; in an off line stage: 1. the image owner generates random numbers required by sub-protocols involved in the protocol and sends the random numbers to $S_i$; in an online stage: 2. $S_i$ perform the following calculation: SecSgn(a)=$b_1$; 3. $S_i$ calculate SS($b_i$, a, 0); in this case, the activation layer protocol SecReLU only requires $\log_3(1+1)1+4$ rounds of interaction, where [A] represents rounding A up.

The secure positive/negative judgment protocol SecSgn is as follows: the double cloud platforms $S_i$ own secret shares $a_i$ of a value a; in an off line stage: 1. the image owner generates random numbers required by sub-protocols involved in the protocol and sends the random numbers to $S_i$; in an online stage: 2. $S_i$ collaboratively perform the following calculation: SecCmp($2^*=b_i$; 3. $S_i$ perform the following calculation: MSB $(a_i) \oplus b_i = res_i$; thus, the double cloud platforms $S_i$ obtain share values with a plus or minus sign; and if $res_1 \oplus res_2 = 1$, the original value a is a positive number; otherwise, a is a negative number. This scheme only requires $[\log_3 (1+1)]+3$ rounds of interaction.

The secure selection protocol SS is as follows: the double cloud platforms $S_i$ own shares $[b]_i^2$ of a bit value b, and two to-be-selected values x, y; in an off line stage: 1. the image owner generates a random bit value c as well as shares $[c]_i^2$ and $c_1$ of the random bit value on $Z_2$ and $Z_L$, and sends the random bit value as well as the shares to $S_i$; 2. the image owner generates random numbers required by sub-protocols involved in the protocol and sends the random numbers to $S_i$; in an online stage: 3. $S_i$ perform the following calculation: $[e]=[b]_i^2 \oplus [c]_i^2$; 4. $S_i$ restore e; 5. If e=1, $S_1$ lets $c_1=1-c_1$, and $S_2$ lets $c_2=-c_2$; 6. $S_i$ perform the following calculation: $res_i$=SecMul($y_i-x_i$, $c_i$)+$x_i$. In this case, the double cloud platforms $S_i$ obtain share values of a secret selection result; if b is 0, $res_1+res_2=x$; otherwise, $res_1+res_2=y$. The secure selection protocol SS can effectively avoid disclosing location information of positive values in the ReLU layer.

The secure value comparison protocol SecCmp is as follows: the double cloud platforms $S_i$ own secret shares $a_i$ of a value a; in an offline stage: 1. the image owner generates a random value x as well as bits corresponding to the random value; 2. the image owner calculates share values $x_i$ of x as well as share values $[x[t]]_i^2$ of the bits of the random value, and sends the calculated share values to the double cloud platforms $S_i$; 3. the image owner calculates whether $x_1+x_2$ is greater than L (whether domain crossing occurs); if yes, $\alpha=0$; otherwise, $\alpha=1$; then, the image owner generates a share $[a]_i^2$ of a on $Z_2$; in an online stage: 4. $S_i$ perform the following calculation: $r_i=a_i+x_i$ and determine whether $a_i+x_i$ is greater than L; if yes $\beta_i=1$; otherwise, =0; 5. $S_i$ restore r and determine whether $r_1+r_2$ is greater than L; if yes, $\delta=1$; otherwise, $\delta=0$; 6. $S_i$ collaboratively perform the following calculation: $\text{SecBitCmp}([x[t]]_i^2, r+1)=[\eta]_i^2$. In step 6, $S_i$ performs the calculation of $\theta_1=\beta_1 \oplus 6 \oplus \eta_1 \oplus \alpha_1$ and $S_2$ performs the calculation of $\theta_2=\beta_2 \oplus \eta_2 \oplus \alpha_2$; thus, the double cloud platforms $S_i$ obtain share values of whether a is greater than L, that is, this protocol implements $\text{SecCmp}(a_i|x_i, [x[t]]_i^2, [a]_i^2)=\theta_i$.

The secure bit comparison protocol SecBitCmp is as follows: the double cloud platforms $S_i$ each own a share $[x[t]]_i^P$ of all 1 bits x[t] of a secret value x under $Z_p$, 1 bits r[t] of a public number r, a share $[\beta]_i^2$ and $[\beta]_i^P$ of a random bit $\beta$ under $Z_2$ and $Z_p$, and a secret share $[m]_i^P$ of a random number m, where $m \in Z_p^*$ (that is, m is a positive integer less than p); in an off line stage: 1. the image owner generates random numbers required by sub-protocols involved in the protocol and sends the random numbers to the double cloud platforms $S_i$; in an online stage: 2. $S_i$ perform the following calculation: $u[i]=\text{SecMul}([1-2\beta]_i^P, [x[t]]_i^P-r[t])$, where $t\in[0, l-1]$, and it should be noted that only one party needs to complete the calculation of adding 1 and subtracting r[t], while the other party only needs to provide $2[\beta]_i^P$ and $[x[t]]_i^P$; 3. $S_i$ perform the following calculation: $[w[t]]_i^P=[x[t]]_i^P-2^*r[t]^* [x[t]]_i^P \pmod{p}$, where $S_1$ performs the calculation of $[w[t]]_i^P=[w[t]]_i^P+r[t] \pmod{p}$; 4. $S_i$ perform the following calculation: $[c[t]]_i^P=[u[t]]_i^P+\Sigma_{k=i+1}^{l}[w[k]]_i^P, \pmod{p}$, and then $S_i$ performs the calculation of $[c[t]]_i^P=1+[c[t]]_i^P, \pmod{p}$; 5. $S_i$ perform the following calculation $d=m_i^* \Pi_{t=0}^{l-1} c[t] \pmod{p}$, where multiplication in this step is secure multiplication, and the calculation is completed by using a three-number multiplication protocol SecThreeMul and a secure multiplication protocol SecMul; 6. if $d=0$, $S_i$ obtains bits $[\eta]_1^2=[\beta]_1^2$; otherwise, $S_1$ obtains bits $[\eta]_1^2=[\beta]_1^2 \oplus 1$; $S_2$ obtains bits $[\eta]_2^2=[\beta]_2^2$; the double cloud platforms $S_i$ each obtain a share value of a comparison result, that is, this protocol implements $\text{SecCmp}([x[t]]_i^P, r|[\beta]_i^2, [\beta]_i^P, m_i)=[\eta]_i^2$.

Similarly, the secure multiplication protocol SecMul is as follows: the double cloud platforms $S_i$ own $u_i, v_i$; in an off line stage: 1. the image owner generates random numbers a, b, c that satisfy c=ab, then performs additive decomposition on a, b, c, and sends $(a_i, b_i, c_i)$ to the double cloud platforms $S_i$; in an online stage: 2. $S_i$ perform the following calculation: $a_i=u_i-a_i, =v_i-b_i$; 3. $S_i$ share $a_i$ and $u_i$; 4. $S_i$ perform the following calculation: $f_i=c_i+b_i\alpha+a_i\beta+(i-1)\alpha\beta$. In this case, $f_1+f_2=uv$, that is, this protocol implements $\text{SecMul}(x_i, y_i) \rightarrow (x^*y)_i$.

The three-number multiplication protocol SecThreeMul is as follows: the double cloud platforms $S_i$ own $x_i, y_i, z_i$; in an off line stage: 1. the image owner generates random numbers required by sub-protocols involved in the protocol and sends the random numbers to $S_i$; 2. the image owner generates random integers a, b, c and performs the following calculation: d=abc; 3. the image owner calculates additive secret shares of a, b, c, d and sends the secret shares to $S_i$; in an online stage: 4. $S_i$ collaboratively calculate $\text{SecMul}(x_i, y_i)$, $\text{SecMul}(x_i, z_i)$, and $\text{SecMul}(y_i, z_i)$ to obtain $xy_i, xz_i$, and $yz_i$; 5. $S_i$ perform the following calculation $e_i=x_i-a_i, f_i=y_i-b_i$, and $g_i=z_i-c_i$, and collaboratively restore e, f, g; 6. $S_i$ perform the following calculation: $xyz_i=d_i-x_i^*f^*g-y_i^*e^*g-z_i^*e^*f+e^*yz_i+f^*xz_i+g^* xy_i$; 7. $S_i$ perform the following calculation: $xyz_i=xyz_i+e^*f^* g$; thus, the double cloud platforms $S_i$ obtain two additive secret shares of xyz; that is, this protocol implements $\text{SecThreeMul}(x_i, y_i, z_i) \rightarrow (x^*y^* z)_i$.

Further, the pooling layer is a 2*2 max pooling layer, which is used to find a maximum value among four numbers. To reduce the rounds of communication, this scheme is implemented in a concurrent manner, that is, every two numbers among the four numbers are compared with each other. Preferably, the pooling layer protocol SecMaxpool in the present disclosure is as follows: the double cloud platforms $S_i$ own to-be-compared data $x_i, y_i, z_1, t_i$. In an off line stage: 1. the image owner generates random numbers required by sub-protocols involved in the protocol and sends the random numbers to $S_i$; in an online stage: 2. $S_i$ call SecSgn and SS to calculate $\max(x_i, y_i)$ and $\max(z_i, t_i)$;

3. $S_i$ call SecSgn and SS to calculate $\max(\max(x_i, y_i), \max(z_i, t_i))$. In this case, SecMaxpool only requires $2 [\log_3 (1+1)]+8$ rounds of interaction, and the foregoing protocol can ensure that the location of the maximum value is not disclosed, thereby improving the information security of the image.

Specifically, a secure distance SecDis between two vectors is obtained in the following manner: the double cloud platforms own encrypted vectors $\{x_i\}$ and $\{y_i\}$. In an off line stage: 1. image owners generate random numbers required by sub-protocols involved in the protocol and send the random numbers to $S_i$; in an online stage: 2. $S_i$ calculate differences between vector elements, and collaboratively calculate $\text{SecMul}(x_i-y_i, x_i-Y_i)$; 3. $S_i$ calculate a sum of all distances. In this case, secret shares of a squared value of a Euclidean distance between two vectors have been obtained. Because the square does not change the magnitude relationship, while the rooting operation is complex in the ciphertext, the present disclosure directly uses the squared value for subsequent measurement.

Specifically, the present disclosure uses a non-information-theoretic-secure distance measurement method to measure a large quantity of distances. It is noticed that the distance values from two images to the original image information are large, and it is expensive and unnecessary to continue using the information-theoretic-secure comparison scheme. It is noted that the Euclidean distance value between images usually falls in a small range. Therefore, the present disclosure masks the original values by using a random multiplication and addition, and exposes the masked values. By sorting the masked values, the magnitude relationship of the unmasked values can be obtained. This is implemented by the following calculation process SecSort:

The double cloud platforms $S_i$ each own a share $\{x_i\}$ of a large quantity of to-be-compared values; in an off line stage: 1. image owners generate random numbers required by sub-protocols involved in the protocol and send the random numbers to $S_i$; 2. the image owner generates a random positive value k and a random value b, and sends share values thereof to the double cloud platforms $S_i$, where value ranges of the value k and the value b are determined in advance, and it is ensured that a result of kx+b is definitely within a share range of x, where $0.1 < k < 10$, and $-100 < b < 100$; in an online stage: 3. the double cloud platforms $S_i$ calculate $\text{SecMul}(k_i, \{x_i\})+b_i$ and disclose the value of $\{kx+b\}$. Obviously, a value ranking of $\{kx+b\}$ is equal to a value ranking of x.

Figure 2:
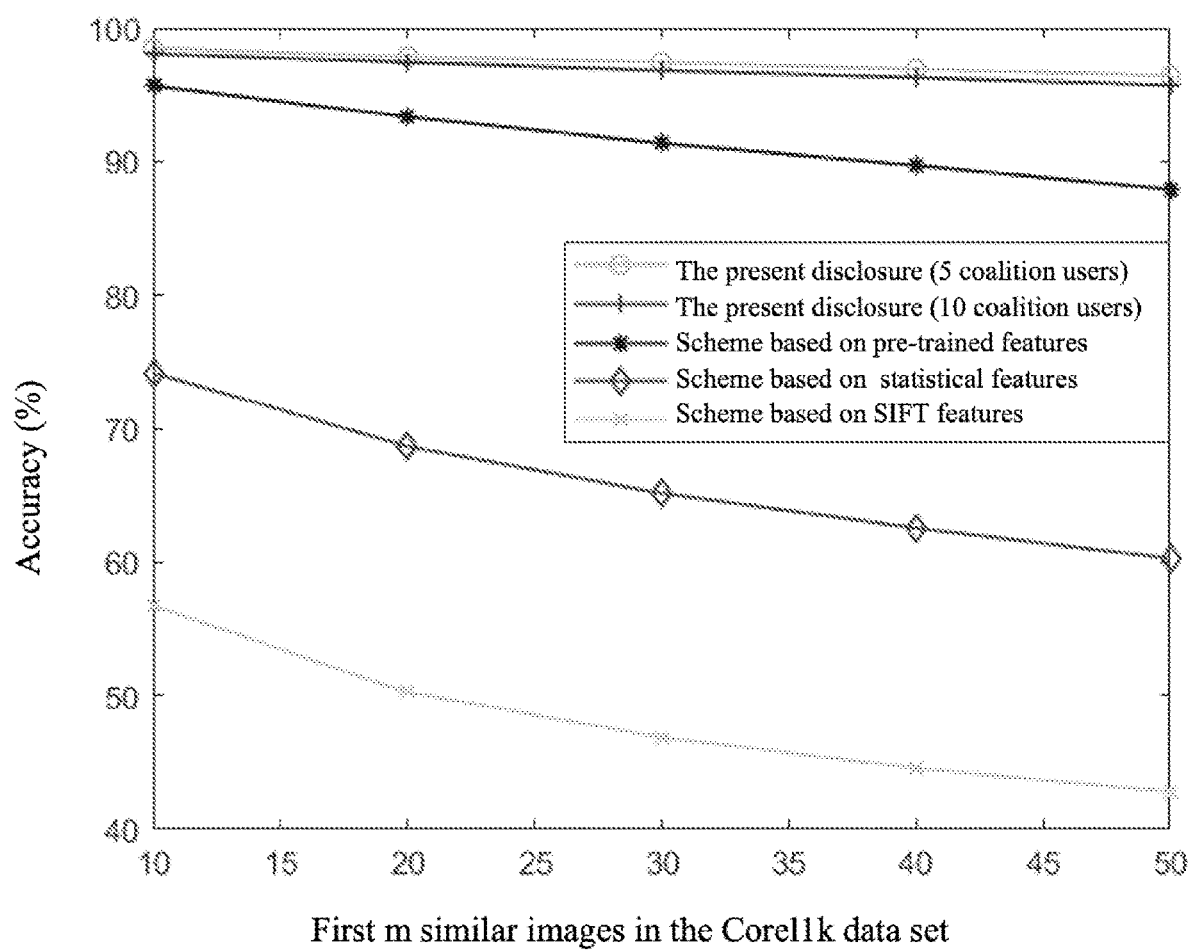
FIG. 2 is a diagram of accuracy comparison between the scheme in the present disclosure and some schemes in the prior art in the case of 50 returned results on a Corel1k dataset.
Figure 3:
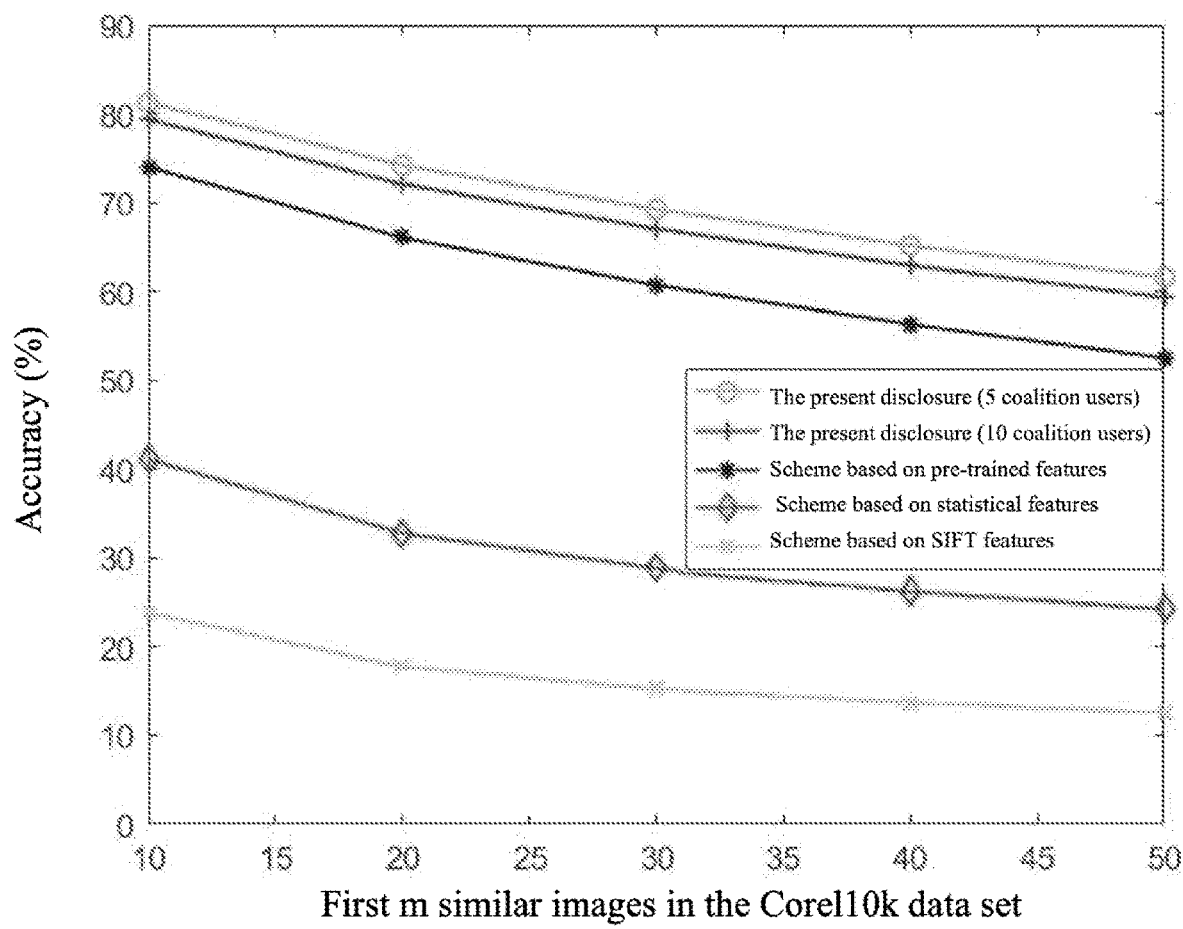
FIG. 3 is a diagram of accuracy comparison between the scheme in the present disclosure and some schemes in the prior art in the case of 50 returned results on a Corel10k dataset.

In the present disclosure, a new secure positive/negative judgment protocol is designed. Compared with the latest research, only two non-collaborating service providers are required, and the number of interaction rounds is reduced from $4+[\log_2 l]$ to $3+[\log_3 (l+1)]$. That is, efficient, secure and practical retrieval is realized. Compared with the latest research, the information theoretic security and location security of the neural network parameters are ensured. After experiments, it is found that compared with the existing encrypted image retrieval scheme based on pre-trained convolutional neural network weights, the present disclosure can improve the accuracy by 8.93%-17.26% in the case of 50 returned results on both Corel1k and Corel10k datasets, as shown in FIG. 2 and FIG. 3.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

It should be noted that, the image owner and the authorized user mentioned in this embodiment do not refer to the users themselves, but refer to systems, software or application sides used by the image owner and the authorized user. The generation of the random numbers and the restoration of the original plaintext image based on image analysis are implemented by the corresponding systems, software or application sides.

Although terms such as the image owner, convolutional neural network, gradient analysis, tension analysis, image sharing, comparison feature, and encrypted feature are used extensively herein, the possibility of using other terms is not excluded. The terms are only intended to describe and explain the essence of the present disclosure more conveniently. It is contrary to the spirit of the present disclosure to interpret these terms as any additional limitation.

What is claimed is:

1. A multi-source encrypted image retrieval method based on federated learning and secret sharing, comprising the following steps:
   S1. performing model training on a convolutional neural network of double cloud platforms $S_i$ based on federated learning, with an image owner joining the double cloud platforms as a coalition member; and
   S2. completing, by an authorized user, encrypted image retrieval based on additive secret sharing with the assistance of the double cloud platforms;
   wherein in step S1, the image owner trains the neural network in the following manner:
   S11. obtaining, by the image owner, a network structure, weight information $W_i$, and bias information $b_i$ of the convolutional neural network from the double cloud platforms $S_i$, and restoring the convolutional neural network: $W=W_1+W_2$, $b=b_1+b_2$;
   S12. making labels of to-be-uploaded pictures, and train the convolutional neural network by using the to-be-uploaded pictures;
   S13. after the training is finished, sending two gradient shares $G_1$ and $G_2$ of gradient information G, two image shares $\{I_1\}$ and $\{I_2\}$ of to-be-uploaded image information $\{I\}$, and two tension shares $\{T_1\}$, $\{T_2\}$ of to-be-uploaded tension information $\{T\}$ to two cloud platforms $S_1$ and $S_2$ respectively; and
   S14. updating, by the double cloud platforms $S_i$, the weight information according to the gradient shares $G_i$, and performing calculation on the tension shares $T_i$ by using the network after the weight update to obtain comparison features $\{F_i\}$;
   wherein in step S14, the comparison features $\{F_1\}$ are obtained in the following manner:
   S141. performing, by the double cloud platforms $S_i$, encrypted feedforward computing on the received tension shares $T_i$ by using the network after the weight update, and extracting features of last pooling layers;
   S142. performing additive aggregation on the features of the pooling layers; and
   S143. using feature vectors after the additive aggregation as the comparison features $\{F_i\}$;
   a computing strategy of the encrypted feedforward computing comprises an activation layer protocol SecReLU for the activation layers, and the activation layer protocol SecReLU is as follows: the double cloud platforms own shares of a value a; in an off line stage: 1. the image owner generates random numbers and sends the random numbers to $S_i$; in an online stage: 2. $S_i$ perform the following calculation: $SecSgn(a)=b_i$; 3. $S_i$ calculate $SS(b_i, a, 0)$;
   wherein SecSgn is a secure positive/negative judgment protocol, SS is a secure selection protocol, and the secure positive/negative judgment protocol SecSgn comprises a secure value comparison protocol SecCmp, a secure bit comparison protocol SecBitCmp, and a three-number multiplication protocol Sec ThreeMul.

2. The multi-source encrypted image retrieval method based on federated learning and secret sharing according to claim 1, wherein in step S11, the network structure of the convolutional neural network comprises convolutional layers, activation function layers, pooling layers, and fully connected layers; node quantities of the fully connected layers of the double cloud platforms $S_1$ are consistent with image types involved in the double cloud platforms $S_i$, and convolutional layers of initial networks of the double cloud platforms S, use pre-trained weights, initial weights of the fully connected layers are generated randomly based on a normal distribution, and all subsequent image owners re-train the model having updated network parameters through steps S11 to S14.

3. The multi-source encrypted image retrieval method based on federated learning and secret sharing according to claim 2, wherein step S2 specifically comprises:
   S21. converting, by the authorized user, a to-be-queried picture into tension information, splitting the tension information {QT} by means of additive secret sharing, and sending the split tension information to the double cloud platforms $S_i$ respectively;
   S22. performing, by the double cloud platforms $S_i$, collaborative encryption computing according to the tension shares $QT_1$ of the tension information, to obtain respective encrypted features $QF_C$;
   S23. collaboratively measuring, by the double cloud platforms $S_i$, distances between the extracted encrypted features $QF_C$ and the comparison features $\{F_F\}$, and returning image information $\{I_i\}$ of similar images to the authorized user according to measurement results; and
   S24. restoring, by the authorized user, an original plaintext image $\{I\}$ based on the two image shares $\{I_i\}$.

4. The multi-source encrypted image retrieval method based on federated learning and secret sharing according to claim 3, wherein
   in step S22, the encrypted features $QF_C$ are obtained in the following manner:
   S221. performing, by the double cloud platforms $S_i$, encrypted feedforward computing on the received tension shares $QT_1$, and extracting features of last pooling layers;
   S222. performing additive aggregation on the features of the pooling layers; and
   S223. using feature vectors after the additive aggregation as the encrypted features $Q F_i$.

5. The multi-source encrypted image retrieval method based on federated learning and secret sharing according to claim 4, wherein the computing strategy of the encrypted feedforward computing further comprises a Beaver's triplet-based secure multiplication protocol SecMul for the fully connected layers and the convolutional layers and a pooling layer protocol SecMaxpool for max pooling layers;

the secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends ($a_i$, $b_i$, $c_i$) to $S_i$; in an online stage: 2. $S_i$ perform the following calculation: $a_i=u_i-a_i$, $f_i=v_i-b_i$; 3. $S_i$ restore $\alpha$ and $\beta$; 4. $S_i$ perform the following calculation: $f_i=c_i+b_i\alpha+a_i\beta+(i-1)\alpha\beta$, wherein in this case, $f_1+f_2=uv$, that is, this protocol implements SecMul($x_i$, $y_i$)→$(x*y)_i$.

6. The multi-source encrypted image retrieval method based on federated learning and secret sharing according to claim 1, wherein the secure positive/negative judgment protocol SecSgn is as follows: the double cloud platforms $S_i$ own secret shares $a_i$ of a value a; in an off line stage: 1. the image owner generates random numbers and sends the random numbers to $S_i$; in an online stage: 2. $S_i$ collaboratively perform the following calculation: SecCmp $(2*a_i)=b_i$; 3. $S_i$ perform the following calculation: MSB $(a_i)$ $b_i$=res$_i$;

the secure selection protocol SS is as follows: the double cloud platforms $S_i$ own shares $[b]_i^2$ of a bit value b, and two to-be-selected values x, y; in an off line stage: 1. the image owner generates a random bit value c as well as shares $[c]_i^2$ and $c_i$ of the random bit on $Z_2$ and $Z_L$, and sends the random bit value as well as the shares to $S_i$; 2. the image owner generates random numbers and sends the random numbers to $S_i$; in an online stage: 3. $S_i$ perform the following calculation: $[e]_i^2=[b]_i^2\oplus[c]_i^2$; 4. $S_i$ Restore e; 5. if e=1, $S_1$ lets $c_1=1-c_1$, and $S_2$ lets $c_2=-c_2$; 6. $S_i$ perform the following calculation: res$_i$=SecMul($y_i-x_i$, $c_i$)+$x_i$, the secure value comparison protocol SecCmp is as follows: the double cloud platforms $S_i$ own secret shares $a_i$ of a value a; in an off line stage: 1. the image owner generates a random value x as well as bits corresponding to the random value; 2. the image owner calculates share values $x_i$ of x as well as share values $[x[t]]_i^2$ of the bits of the random value, and sends the calculated share values to the double cloud platforms $S_i$; 3. the image owner calculates whether $x_i+x_2$ is greater than L; if yes, $\alpha=0$; otherwise, $\alpha=1$; then, the image owner generates a share $[a]_i^2$ of $\alpha$ on $Z_2$; in an online stage: 4. $S_i$ perform the following calculation: $r_i=a_i+x_i$ and determine whether $a_i+x_i$ is greater than L; if yes $\beta_i=1$; otherwise, =0; 5. $S_i$ restore r and determine whether $r_i+r_2$ is greater than L; if yes, 6=1; otherwise, δ=0; 6. $S_i$ collaboratively perform the following calculation: SecBitCmp($[x[t]]_i^2$, r+1)=$[\eta]_i^2$, wherein in step 6, $S_i$ performs the calculation of $\theta_1=\beta_1\oplus\delta\oplus\eta_1\oplus\alpha_1$ and $S_2$ performs the calculation of $\theta_2=\beta_2\oplus\eta_2\oplus\alpha_2$; and the secure bit comparison protocol SecBitCmp is as follows: the double cloud platforms $S_i$ each own a share $[x[t]]_i^P$ of all 1 bits x[t] of a secret value x under $Z_p$, 1 bits r[t] of a public number r, a share $[\beta]_i^2$ and $[3]_i^P$ of a random bit β under $Z_2$ and $Z_p$, and a secret share of a random number m; in an off line stage: 1. the image owner generates random numbers and sends the random numbers to the double cloud platforms $S_i$; in an online stage: 2. $S_i$ perform the following calculation: u[i]=SecMul($[1-2\beta]_i^P$, $[x[t]]_i^P-r[t])t\in[0, 1-1]$; 3. $S_i$ perform the following calculation $[w[t]]_i^P=[x[t]]_i^P-2*r[t]*[x[t]]_i^P \pmod p$, and $S_1$ performs the calculation of $[w[t]]_i^P=[w[t]]_1^P+r[t] \pmod p$; 4. $S_i$ perform the following calculation: $[c[t]]_i^P=[u[t]]_i^P+\Sigma_{k=i+1}^l[w[k]]_i^P \pmod p$, and then $S_i$ performs the calculation of $[c[t]]_i^P=1+[c[t]]_i^P \pmod p$; 5. $S_i$ perform the following calculation $d=m_i*\Pi_{t=0}^{l-1}c[t] \pmod p$, wherein the calculation is completed by using a three-number multiplication protocol SecThreeMul and a secure multiplication protocol SecMul; 6. if d=0, $S_i$ obtains bits $[\eta]_1^2=[\beta]_1^2$; otherwise, $S_i$ obtains bits $[\eta]_1^2=[\beta]_1^2\oplus 1$; $S_2$ obtains bits $[\eta]_2^2=[\beta]_2^2$.

7. The multi-source encrypted image retrieval method based on federated learning and secret sharing according to claim 6, wherein in step S11, the network structure of the convolutional neural network comprises convolutional layers, activation function layers, pooling layers, and fully connected layers; node quantities of the fully connected layers of the double cloud platforms $S_i$ are consistent with image types involved in the double cloud platforms $S_i$, and convolutional layers of initial networks of the double cloud platforms $S_i$ use pre-trained weights, initial weights of the fully connected layers are generated randomly based on a normal distribution, and all subsequent image owners re-train the model having updated network parameters through steps S11 to S14.

8. The multi-source encrypted image retrieval method based on federated learning and secret sharing according to claim 7, wherein step S2 specifically comprises:

S21. converting, by the authorized user, a to-be-queried picture into tension information, splitting the tension information {QT} by means of additive secret sharing, and sending the split tension information to the double cloud platforms $S_i$ respectively;

S22. performing, by the double cloud platforms $S_i$, collaborative encryption computing according to the tension shares $QT_i$ of the tension information, to obtain respective encrypted features $QF_i$;

S23. collaboratively measuring, by the double cloud platforms $S_i$, distances between the extracted encrypted features $QF_C$ and the comparison features {$F_i$}, and returning image information {$I_i$} of similar images to the authorized user according to measurement results; and S24. restoring, by the authorized user, an original plaintext image {I} based on the two image shares {$I_i$}.

9. The multi-source encrypted image retrieval method based on federated learning and secret sharing according to claim 8, wherein in step S22, the encrypted features $QF_C$ are obtained in the following manner:

S221. performing, by the double cloud platforms $S_i$, encrypted feedforward computing on the received tension shares $QT_1$, and extracting features of last pooling layers;

S222. performing additive aggregation on the features of the pooling layers; and S223. using feature vectors after the additive aggregation as the encrypted features $QF_i$.

10. The multi-source encrypted image retrieval method based on federated learning and secret sharing according to claim 9, wherein the computing strategy of the encrypted feedforward computing further comprises a Beaver's triplet-based secure multiplication protocol SecMul for the fully connected layers and the convolutional layers and a pooling layer protocol SecMaxpool for max pooling layers;

the secure multiplication protocol SecMul is as follows: the double cloud platforms $S_i$ own $u_1$, $v_i$; in an off line stage: 1. the image owner generates random numbers a, b, c that satisfy c=ab, then performs additive decomposition on a, b, c, and sends ($a_i$, $b_i$, $c_i$) to $S_i$; in an online stage: 2. $S_i$ perform the following calculation: $a_i=u_1-a_i$, $\beta_i=v_i-b_i$; 3. $S_i$ restore $\alpha$ and $\beta$; 4. $S_i$ perform the following calculation: $f_i=c_i+b_i\alpha+a_i\beta+(i-1)\alpha\beta$, wherein in this case, $f_1+f_2=uv$, that is, this protocol implements SecMul($x_i$, $y_i$) $(x*y)_i$.

11. The multi-source encrypted image retrieval method based on federated learning and secret sharing according to claim 6, wherein the secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends ($a_i$, $b_i$, $c_i$) to the double cloud platforms $S_i$; in an online stage: 2. $S_i$ perform the following calculation: $a_i=u_i-a_i$, $=v_i-b_i$; 3. $S_i$ share $a_i$ and $\beta_i$; 4. $S_i$ perform the following calculation: $f_i=c_i+b_i\alpha++(i-1)\alpha\beta$, $f_1+f_2=uv$;

the three-number multiplication protocol SecThreeMul is as follows: the double cloud platforms $S_i$ own $x_i$, $y_i$, $z_i$; in an off line stage: 1. the image owner generates random numbers and sends the random numbers to $S_i$; 2. the image owner generates random integers a, b, c and performs the following calculation: d=abc; 3. the image owner calculates secret shares of a, b, c, d and sends the secret shares to $S_i$; in an online stage: 4. $S_i$ collaboratively calculate SecMul($x_i$, $y_i$), SecMul($x_i$, $z_i$), and SecMul($y_i$, $z_i$) to obtain $xy_i$, $xz_i$, and $yz_i$; 5. $S_i$ perform the following calculation $e_i=x_i-a_i$, $f_i=y_i-b_i$, and $g_i=z_i-c_i$, and collaboratively restore e, f, g; 6. $S_i$ perform the following calculation: $xyz_i=d_i-x_i*f*g-y_i*e*g-z_i*e*f+e*yz_i+f*xz_i+g*xy_i$; 7. $S_1$ perform the following calculation: $xyz_1=xyz_1+e*f*g$;

the pooling layer is a max pooling layer, and the pooling layer protocol SecMaxpool is as follows: the double cloud platforms $S_i$ own to-be-compared data $x_i$, $y_i$, $z_i$, $t_i$; in an off line stage: 1. the image owner generates random numbers required by sub-protocols involved in the protocol and sends the random numbers to $S_i$; in an online stage: 2. $S_i$ call SecSgn and SS to calculate max($x_i$, $y_i$) and max($z_i$, $t_i$); 3. $S_i$ call SecSgn and SS to calculate max(max($x_i$, $y_i$), max($z_i$, $t_i$)).

12. The multi-source encrypted image retrieval method based on federated learning and secret sharing according to claim 7, wherein the secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends ($a_i$, $b_i$, $c_i$) to the double cloud platforms $S_i$; in an online stage: 2. $S_i$ perform the following calculation: $a_i=u_i-a_i$, $=v_i-b_i$; 3. $S_i$ share $a_i$ and $\beta_i$; 4. $S_i$ perform the following calculation: $f_i=c_i+b_i\alpha+a_i\beta+(i-1)\alpha\beta$, $f_1+f_2=uv$;

the three-number multiplication protocol SecThreeMul is as follows: the double cloud platforms $S_i$ own $x_i$, $y_i$, $z_i$; in an off line stage: 1. the image owner generates random numbers and sends the random numbers to $S_i$; 2. the image owner generates random integers a, b, c and performs the following calculation: d=abc; 3. the image owner calculates secret shares of a, b, c, d and sends the secret shares to $S_i$; in an online stage: 4. $S_i$ collaboratively calculate SecMul($x_i$, $y_i$), SecMul($x_i$, $z_i$), and SecMul($y_i$, $z_i$) to obtain $xy_i$, $xz_i$, and $yz_i$; 5. $S_i$ perform the following calculation $e_i=x_i-a_i$, $f_i=y_i-b_i$, and $g_i=z_i-c_i$, and collaboratively restore e, f, g; 6. $S_i$ perform the following calculation: $xyz_i=d_i-x_i*f*g-y_i*e*g-z_i*e*f+e*yz_i+f*xz_i+g*xy_i$; 7. $S_1$ perform the following calculation: $xyz_1=xyz_1+e*f*g$;

the pooling layer is a max pooling layer, and the pooling layer protocol SecMaxpool is as follows: the double cloud platforms $S_i$ own to-be-compared data $x_i$, $y_i$, $z_i$, $t_i$; in an offline stage: 1. the image owner generates random numbers required by sub-protocols involved in the protocol and sends the random numbers to $S_i$; in an online stage: 2. $S_i$ call SecSgn and SS to calculate max($x_i$, $y_i$) and max($z_i$, $t_i$); 3. $S_i$ call SecSgn and SS to calculate max(max($x_i$, $y_i$), max($z_i$, $t_i$)).

13. The multi-source encrypted image retrieval method based on federated learning and secret sharing according to claim 8, wherein the secure multiplication protocol SecMul is as follows: the double cloud platforms $S_i$ own $u_i$, $v_i$; in an offline stage: 1. the image owner generates random numbers a, b, c that satisfy c=ab, then performs additive decomposition on a, b, c, and sends ($a_i$, $b_i$, $c_i$) to the double cloud platforms $S_i$; in an online stage: 2. $S_i$ perform the following calculation: $a_i=u_i-a_i$, $=v_i-b_i$; 3. $S_i$ share $a_i$ and $\beta_i$; 4. $S_i$ perform the following calculation: $f_i=c_i+b_i\alpha+a_i\beta+(i-1)\alpha\beta$, $f_1+f_2=uv$;

the three-number multiplication protocol SecThreeMul is as follows: the double cloud platforms $S_i$ own $x_i$, $y_i$, $z_i$; in an offline stage: 1. the image owner generates random numbers and sends the random numbers to $S_i$; 2. the image owner generates random integers a, b, c and performs the following calculation: d=abc; 3. the image owner calculates secret shares of a, b, c, d and sends the secret shares to $S_i$; in an online stage: 4. $S_i$ collaboratively calculate SecMul($x_i$, $y_i$), SecMul($x_i$, $z_i$), and SecMul($y_i$, $z_i$) to obtain $xy_i$, $xz_i$, and $yz_i$; 5. $S_i$ perform the following calculation $e_i=x_i-a_i$, $f_i=y_i-b_i$, and $g_i=z_i-c_i$, and collaboratively restore e, f, g; 6. $S_i$ perform the following calculation: $xyz_i=d_i-x_i*f*g-y_i*e*g-z_i*e*f+e*yz_i+f*xz_i+g*xy_i$; 7. $S_i$ perform the following calculation: $xyz_1=xyz_1+e*f*g$;

the pooling layer is a max pooling layer, and the pooling layer protocol SecMaxpool is as follows: the double cloud platforms $S_i$ own to-be-compared data $x_i$, $y_i$, $z_i$, $t_i$; in an off line stage: 1. the image owner generates random numbers required by sub-protocols involved in the protocol and sends the random numbers to $S_i$; in an online stage: 2. $S_i$ call SecSgn and SS to calculate max($x_i$, $y_i$) and max($z_i$, $t_i$); 3. $S_i$ call SecSgn and SS to calculate max(max($x_i$, $y_i$), max($z_i$, $t_i$)).

14. The multi-source encrypted image retrieval method based on federated learning and secret sharing according to claim 9, wherein the secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends ($a_i b_i$, $c_i$) to the double cloud platforms $S_i$; in an online stage: 2. $S_i$ perform the following calculation: $a_i=u_i-a_i$, $\beta_i=v_i-b_i$; 3. $S_i$ share $\alpha_i$ and $\beta_i$; 4. $S_i$ perform the following calculation: $f_i=c_i+b_i\alpha+a_i\beta+(i-1)\alpha\beta$, $f_1+f_2=uv$;

the three-number multiplication protocol SecThreeMul is as follows: the double cloud platforms $S_i$ own $x_i$, $y_i$, $z_i$; in an off line stage: 1. the image owner generates random numbers and sends the random numbers to $S_i$;

2. the image owner generates random integers a, b, c and performs the following calculation: d=abc; 3. the image owner calculates secret shares of a, b, c, d and sends the secret shares to $S_i$; in an online stage: 4. $S_i$ collaboratively calculate SecMul($x_i$, $y_i$), SecMul($x_i$, $z_i$), and SecMul($y_i$, $z_i$) to obtain $xy_i$, $xz_i$, and $yz_i$; 5. $S_i$ perform the following calculation: $e_i=x_i-a_i$, $f_i=y_i-b_i$, and $g_i=z_i-c_i$, and collaboratively restore e, f, g; 6. $S_i$ perform the following calculation: $xyz_i=d_i-x_i*f*g-y_i*e*g-z_i*e*f+e*yz_i+f*xz_i+g*xy_i$; 7. $S_1$ perform the following calculation: $xyz_1=xyz_1+e*f*g$;

the pooling layer is a max pooling layer, and the pooling layer protocol SecMaxpool is as follows: the double cloud platforms $S_i$ own to-be-compared data $x_i$, $y_i$, $z_i$, $t_i$; in an off line stage: 1. the image owner generates random numbers required by sub-protocols involved in the protocol and sends the random numbers to $S_i$; in an online stage: 2. $S_i$ call SecSgn and SS to calculate max($x_i$, $y_i$) and max($z_i$, $t_i$); 3. $S_i$ call SecSgn and SS to calculate max(max($x_i$, $y_i$), max($z_i$, $t_i$)).

15. The multi-source encrypted image retrieval method based on federated learning and secret sharing according to claim 10, wherein the secure multiplication protocol SecMul is as follows: the double cloud platforms $S_i$ own $u_i$, $v_i$; in an off line stage: 1. the image owner generates random numbers a, b, c that satisfy c=ab, then performs additive decomposition on a, b, c, and sends ($a_i b_i$, $c_i$) to the double cloud platforms $S_i$; in an online stage: 2. $S_i$ perform the following calculation: $a_i=u_i-a_i$, $=v_i-b_i$; 3. $S_i$ share $a_i$ and A; 4. $S_i$ perform the following calculation: $f_i=c_i+b_i\alpha+a_i\beta+(i-1)\alpha\beta$, $f_1+f_2=uv$;

the three-number multiplication protocol SecThreeMul is as follows: the double cloud platforms $S_i$ own $x_i$, $y_i$, $z_i$; in an off line stage: 1. the image owner generates random numbers and sends the random numbers to $S_i$; 2. the image owner generates random integers a, b, c and performs the following calculation: d=abc; 3. the image owner calculates secret shares of a, b, c, d and sends the secret shares to $S_i$; in an online stage: 4. $S_i$ collaboratively calculate SecMul($x_i$, $y_i$), SecMul($x_i$, $z_i$), and SecMul($y_i$, $z_i$) to obtain $xy_i$, $xz_i$, and $yz_i$; 5. $S_i$ perform the following calculation: $e_i=x_i-a_i$, $f_i=y_i-b_i$, and $g_i=z_i-c_i$, and collaboratively restore e, f, g; 6. $S_i$ perform the following calculation: $xyz_i=d_i-x_i*f*g-y_i*e*g-z_i*e*f+e*yz_i+f*xz_i+g*xy_i$; 7. $S_1$ perform the following calculation: $xyz_1=xyz_1+e*f*g$;

the pooling layer is a max pooling layer, and the pooling layer protocol SecMaxpool is as follows: the double cloud platforms $S_i$ own to-be-compared data $x_i$, $y_i$, $z_i$, $t_i$; in an off line stage: 1. the image owner generates random numbers required by sub-protocols involved in the protocol and sends the random numbers to $S_i$; in an online stage: 2. $S_i$ call SecSgn and SS to calculate max($x_i$, $y_i$) and max($z_i$, $t_i$); 3. $S_i$ call SecSgn and SS to calculate max(max ($x_i$, $y_i$), max($z_i$, $t_i$)).

16. The multi-source encrypted image retrieval method based on federated learning and secret sharing according to claim 11, wherein in step S3, a method for distance measurement comprises a secure distance protocol SecDis, which is as follows: the double cloud platforms $S_i$ own encrypted vectors $\{x_i\}$ and $\{y_i\}$; in an off line stage: 1. image owners generate random numbers required by sub-protocols involved in the protocol and send the random numbers to $S_i$; in an online stage: 2. $S_i$ calculate differences between vector elements, and collaboratively calculate SecMul($x_i-y_i$, $x_i-y_i$); 3. $S_i$ calculate a sum of all vector values; in this case, the double cloud platforms $S_i$ obtain secret shares of a squared value of a Euclidean distance between two vectors.

17. The multi-source encrypted image retrieval method based on federated learning and secret sharing according to claim 12, wherein in step S3, a method for distance measurement comprises a secure distance protocol SecDis, which is as follows: the double cloud platforms $S_i$ own encrypted vectors $\{x_i\}$ and $\{y_i\}$; in an off line stage: 1. image owners generate random numbers required by sub-protocols involved in the protocol and send the random numbers to $S_i$; in an online stage: 2. $S_i$ calculate differences between vector elements, and collaboratively calculate SecMul($x_i-y_i$, $x_i-Y_i$); 3. $S_i$ calculate a sum of all vector values; in this case, the double cloud platforms $S_i$ obtain secret shares of a squared value of a Euclidean distance between two vectors.

18. The multi-source encrypted image retrieval method based on federated learning and secret sharing according to claim 13, wherein in step S3, a method for distance measurement comprises a secure distance protocol SecDis, which is as follows: the double cloud platforms $S_i$ own encrypted vectors $\{x_i\}$ and $\{y_i\}$; in an off line stage: 1. image owners generate random numbers required by sub-protocols involved in the protocol and send the random numbers to $S_i$; in an online stage: 2. $S_i$ calculate differences between vector elements, and collaboratively calculate SecMul($x_i-y_i$, $x_i-Y_i$); 3. $S_i$ calculate a sum of all vector values; in this case, the double cloud platforms $S_i$ obtain secret shares of a squared value of a Euclidean distance between two vectors.

19. The multi-source encrypted image retrieval method based on federated learning and secret sharing according to claim 14, wherein in step S3, a method for distance measurement comprises a secure distance protocol SecDis, which is as follows: the double cloud platforms $S_i$ own encrypted vectors $\{x_i\}$ and $\{y_i\}$; in an off line stage: 1. image owners generate random numbers required by sub-protocols involved in the protocol and send the random numbers to $S_i$; in an online stage: 2. $S_i$ calculate differences between vector elements, and collaboratively calculate SecMul($x_i-y_i$, $x_i-Y_i$); 3. $S_i$ calculate a sum of all vector values; in this case, the double cloud platforms $S_i$ obtain secret shares of a squared value of a Euclidean distance between two vectors.

20. The multi-source encrypted image retrieval method based on federated learning and secret sharing according to claim 16, wherein in step S23, a method for distance measurement comprises a secure distance protocol SecSort, which is as follows: the double cloud platforms $S_i$ each own a share $\{x_i\}$ of a large quantity of to-be-compared values; in an off line stage: 1. image owners generate random numbers required by sub-protocols involved in the protocol and send the random numbers to $S_i$; 2. the image owner generates a random positive value k and a random value b, and sends share values thereof to the double cloud platforms $S_i$, wherein value ranges of the value k and the value b are determined in advance, and it is ensured that a result of kx+b is definitely within a share range of x; in an online stage: 3. the double cloud platforms $S_i$ calculate SecMul($k_i$, $\{x_i\}$)+$b_i$ and disclose the value of $\{kx+b\}$.

* * * * *